United States Patent
Boding

(10) Patent No.: US 8,645,250 B2
(45) Date of Patent: Feb. 4, 2014

(54) RULES SUGGESTION ENGINE

(75) Inventor: Scott Boding, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/597,930

(22) Filed: Aug. 29, 2012

(65) Prior Publication Data

US 2013/0054438 A1    Feb. 28, 2013

Related U.S. Application Data

(60) Provisional application No. 61/528,463, filed on Aug. 29, 2011.

(51) Int. Cl.
*G06Q 40/00*    (2012.01)

(52) U.S. Cl.
USPC ............................................. 705/35; 705/36

(58) Field of Classification Search
USPC ...................................................... 705/35–40
See application file for complete search history.

(56) References Cited

U.S. PATENT DOCUMENTS

| 7,117,191 B2 | 10/2006 | Gavan et al. |
| 7,527,195 B2 * | 5/2009 | Keithley et al. ............... 235/380 |
| 2008/0162202 A1 | 7/2008 | Khanna et al. |
| 2010/0138345 A1 | 6/2010 | Lekhtman et al. |

FOREIGN PATENT DOCUMENTS

| JP | 2009-187143 A | 8/2009 |
| KR | 10-2009-0131114 A | 12/2009 |

OTHER PUBLICATIONS

International Search Report and Written Opinion mailed Feb. 26, 2013 in PCT/US2012/052893, 11 pages.
U.S. Appl. No. 13/770,895 (unpublished), 71 pages.

* cited by examiner

*Primary Examiner* — Thu Thao Havan
(74) *Attorney, Agent, or Firm* — Kilpatrick Townsend & Stockton LLP

(57) ABSTRACT

Embodiments of the invention are directed to systems and methods for implementing a rules suggestion engine that suggests rules to a user for lowering fraud in future transactions. Embodiments of the invention segment the transaction data based on at least one attribute defined by the user. One or more key indicators are identified corresponding to the segmented data. A correlation is performed between the user defined attribute and one or more key indicators. One or more transaction rules are generated based on the correlation that are suggested to the user for future transactions. The user can customize the rule, a field of rule, a prioritization of the rules, and even create categories of rules.

20 Claims, 12 Drawing Sheets

FIG. 7A

☐ ADDRESS VERIFICATION (4 of 4 applied)

| Monitor | Accept | Review | Reject | Priority | Rule |
|---|---|---|---|---|---|
| ☐ | ☐ | ☑ | ☐ | 4 ▶ | Account issued outside of billing country |
| ☑ | ☐ | ☐ | ☐ | 1 ▶ | AVS service not available |
| ☐ | ☐ | ☐ | ☑ | 2 ▶ | No AVS match |
| ☑ | ☐ | ☐ | ☐ | 1 ▶ | Partial AVS match |

☐ NEW CATEGORY (1 of 1 applied)

| | | | | | |
|---|---|---|---|---|---|
| ☐ | ☐ | ☐ | ☑ | 1 ▶ | High item count and order amount |

Rule Definition

You cannot delete a standard rule. However you can move it from one category to another, and you can indicate whether or not it is a default rule. If you want to edit a standard rule, make a copy of it.

*\* Required Fields*

Name\*: [AVS service not available] — 72

Description\*: [AVS service not available.]

Category: [Address Verification ▶] — 74

☑ Core Rule: set rule to [Monitor ▶] in the profiles added with core rules.

— 75
— 76

PROFILE 1

Rules

☐ ADDRESS VERIFICATION (4 of 4 applied)

| Monitor | Accept | Review | Reject | Priority | Rule |
|---|---|---|---|---|---|
| ☐ | ☐ | ☑ | ☐ | ▼ | Account issued outside of billing country |
| ☐ | ☐ | ☑ | ☐ | ▼ | AVS service not available |
| ☐ | ☐ | ☑ | ☐ | ▼ | No AVS match |
| ☑ | ☐ | ☐ | ☐ | ▼ | Partial AVS match |

☐ CARD VERIFICATION NUMBER (4 of 4 applied)

| Monitor | Accept | Review | Reject | Priority | Rule |
|---|---|---|---|---|---|
| ☑ | ☐ | ☐ | ☐ | ▼ | CVN lead installed |
| ☐ | ☐ | ☑ | ☐ | ▼ | CVN not supported by cardholder's bank |
| ☑ | ☐ | ☐ | ☐ | ▼ | CVN service not available |
| ☑ | ☐ | ☐ | ☐ | ▼ | No CVN match |

☐ CONSUMER DATA VALIDATION (4 of 4 applied)

☐ ORDER DATA QUALITY (7 of 7 applied)

| Monitor | Accept | Review | Reject | Priority | Rule |
|---|---|---|---|---|---|
| ☑ | ☐ | ☐ | ☐ | ▼ | Billing and/or shipping address not verifiable |
| ☑ | ☐ | ☐ | ☐ | ▼ | Correctable errors in addresses |
| ☑ | ☐ | ☐ | ☐ | ▼ | Geolocation inconsistencies in order |
| ☑ | ☐ | ☐ | ☐ | ▼ | Letter combinations not found in English |
| ☑ | ☐ | ☐ | ☐ | ▼ | Obscenities in the name, e-mail, or billing city |
| ☐ | ☐ | ☑ | ☐ | ▼ | Order outside the U.S. |
| ☐ | ☐ | ☑ | ☐ | ▼ | Shipping address different from billing address |

☐ OTHER TESTS (3 of 3 applied)

| Monitor | Accept | Review | Reject | Priority | Rule |
|---|---|---|---|---|---|
| ☐ | ☐ | ☐ | ☑ | ▼ | ☀ Customer on the negative list |
| ☐ | ☑ | ☐ | ☐ | ▼ | ☀ Customer on the positive list |
| ☑ | ☐ | ☐ | ☐ | ▼ | Order outside merchant's region |

FIG. 8

Order Profiles

| Name | Description |
|---|---|
| Passive profile | P - Sample passive profile |
| RejectProfile | test |
| ReviewProfile | test |
| Test 2 | A - test |

Add Profile With Core Rules | Add Empty Profile 100
101

Profile Selectors

This section shows your profile selector rules, and the profile that will be used to evaluate the orders if the conditions are satisfied. The selector rules appear in the order that Detection Manager uses to evaluate them. If no selector rule is triggered or if none is present, the default profile is used to evaluate the orders.

Active Selectors | Passive Selectors

| | Rule Name | Rule Description | Order Profile |
|---|---|---|---|
| 1 | profile selector rule 1 | test | Example |
| 2 | selector rule 2 | test | ReviewProfile |
| 2 | another test | another test | ReviewProfile |
| 2 | internal | test | RejectProfile |

Select a default profile to evaluate orders that do not trigger an active profile selector rule: Test 2

Add Selector Rule

RULES SUGGESTION ENGINE

CROSS-REFERENCES TO RELATED APPLICATIONS

This application is a non-provisional application of and claims the benefit of priority of U.S. Provisional Application No. 61/528,463, filed on Aug. 29, 2011, which is herein incorporated by reference in its entirety for all purposes.

BACKGROUND

Online transactions for purchasing goods and services using the Internet are becoming increasing popular. Even though Internet shopping provides convenience to both consumers and merchants, determining which transactions are legitimate and which transactions are fraudulent is a challenge for the merchants. If a fraudster uses stolen payment data to make purchases, the fraud may not be immediately detected by the merchant and may not be known until a significant time after the purchased items or services have been provided to the fraudster. Thus, the resulting fraud can cost the merchant significant amounts of money in the form of lost revenue and lost stock.

Purchase orders which are easily accepted (i.e., purchases made by consumers that are on a positive list) or rejected (i.e., purchases made by consumers that are on a negative list) can be quickly handled by the current fraud detection software applications. However, for orders that are too difficult for a computer to resolve, merchants need to manually review each and every order to decide whether or not to allow those orders to be processed. Merchants expend significant amounts of time and resources to determine whether transactions are legitimate or fraudulent. As transaction volumes increase, this becomes an increasing problem for merchants.

Further, some fraud detection systems can include fraud detection rules that evaluate transactions and assist merchants in deciding whether a specific transaction should be accepted or rejected by using different sorting algorithms. However, since each industry and often each merchant is different, fraud detection rules may be different among the merchants.

Fraudsters are also continuously trying to reverse-engineer fraud detection software applications. It therefore becomes desirable for the merchants to continually review and update their fraud detection rules to combat the fraudsters.

Embodiments of the invention address this and other problems, individually and collectively.

BRIEF SUMMARY

Embodiments of the invention are directed to systems and methods for providing suggestion rules to merchants for customizing their fraud detection rule profiles.

One embodiment of the invention is directed to a method of automatic fraud detection including segmenting transaction data based on a user defined attribute, identifying one or more key indicators corresponding to the segmented transaction data, determining a correlation between one or more key indicators and the user defined attribute and generating a transaction rule based on the correlation. The transaction rule can be applied to a set of transactions in passive mode to determine if the fraud is lowered or not. If the fraud is lowered, the transaction rule is suggested to the merchant for subsequent transactions.

Another embodiment of the invention is directed to a server computer comprising a processor and a non-transitory computer-readable storage medium. The computer readable medium comprises code executable by the processor for implementing a method. The method comprises providing suggestion rules, by a server computer, which users (merchants) at a client computer can use for fraud detection. Transaction data at the server computer is segmented based on an attribute defined by a user at the client computer, one or more key indicators corresponding to the segmented transaction data are identified, and a correlation is determined between one or more key indicators and the user defined attribute to generate a transaction rule. The transaction rule can be applied to a set of transactions in passive mode to determine if the fraud is lowered or not. If the fraud is lowered, the transaction rule is suggested to the user for subsequent transactions.

Another embodiment of the invention is directed to a method comprising: accessing a server computer by a client computer, wherein the server computer is configured to implement a method comprising obtaining transaction data, segmenting the transaction data based on at least one attribute defined by a user, identifying one or more key indicators corresponding to the segmented transaction data, determining a correlation between the one or more key indicators and the user defined attribute, and generating by the processor one or more suggested transaction rules based on the correlation; receiving a selection of the one or more suggested transaction rules at the client computer from the user; and providing, by the client computer, the selection of the one or more suggested transaction rules to the server computer.

Another embodiment of the invention is directed to a client computer comprising: a processor; and a computer readable medium coupled to the processor, the computer readable medium comprising code, executable by the processor for implementing a method comprising accessing a server computer by a client computer, wherein the server computer is configured to implement a method comprising obtaining transaction data, segmenting the transaction data based on at least one attribute defined by a user, identifying one or more key indicators corresponding to the segmented transaction data, determining a correlation between the one or more key indicators and the user defined attribute, and generating by the processor one or more suggested transaction rules based on the correlation, receiving a selection of the one or more suggested transaction rules from the user, and providing the selection of the one or more suggested transaction rules to the server computer.

These and other embodiments of the invention are described in further detail below with reference to the Figures and the Detailed Description.

BRIEF DESCRIPTION OF THE DRAWINGS

FIG. 7A shows a user interface including two categories having sets of rules in accordance with an embodiment.

FIG. 7B shows a user interface including a rule definition of a rule in a category of FIG. 7A in accordance with an embodiment.

FIG. 8 shows a user interface including an exemplary profile editor with rule category tagging in accordance with an embodiment.

FIG. 10 shows a user interface including order profiles and selection rules in accordance with an embodiment.

DETAILED DESCRIPTION

Figure 1:
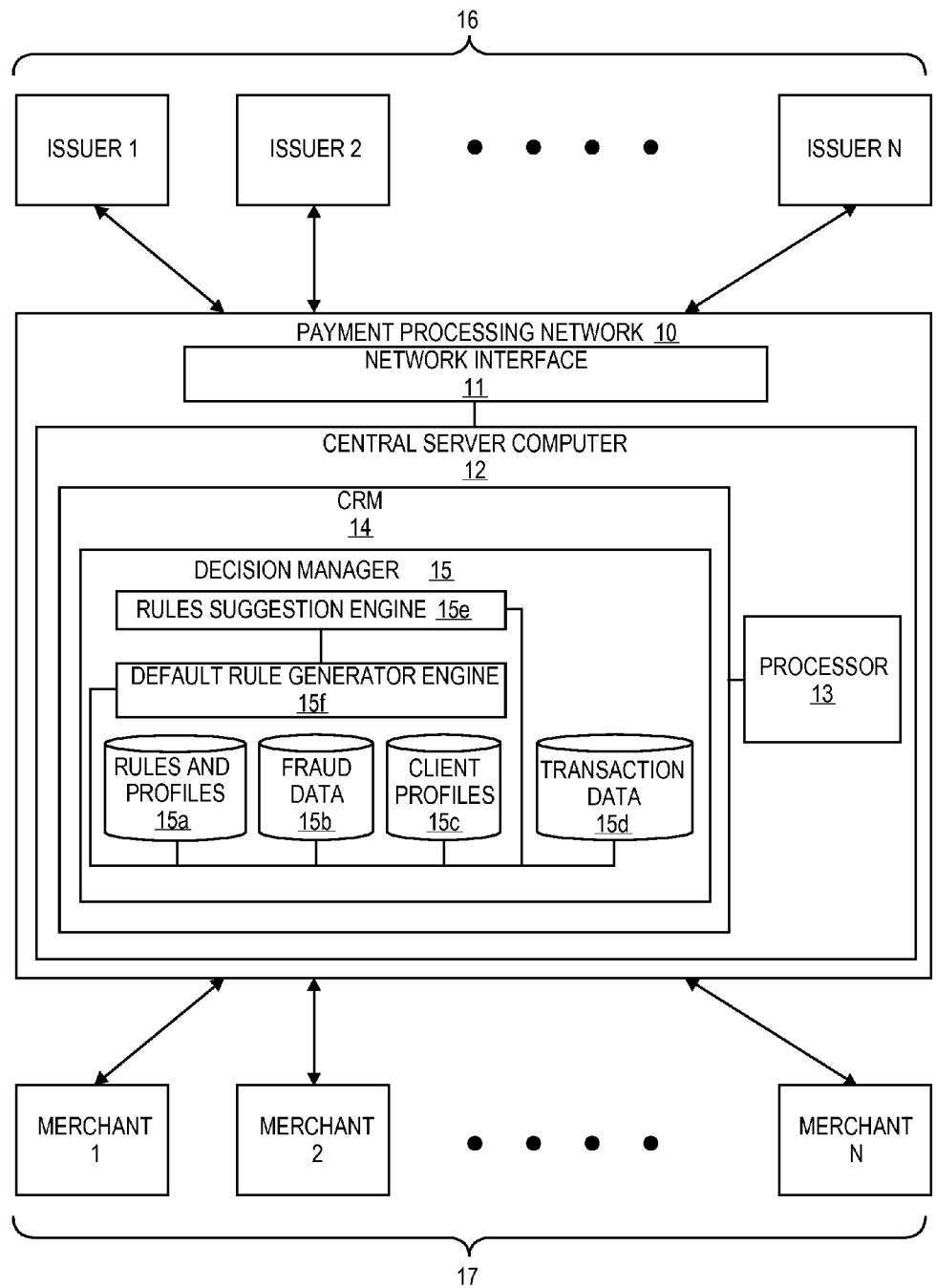
FIG. 1 shows a system having a rules suggestion engine in accordance with an embodiment.

Prior to discussing embodiments of the invention, description of some terms may be helpful in understanding embodiments of the invention.

"Transaction data" may include data relating to a plurality of transactions such as a plurality of payment transactions. In some embodiments, the transaction data may comprise at least 10, 100, 1000, or even over 10,000 transactions. In some embodiments, the transaction data may include transactions that are clearly not fraudulent or are clearly not authentic. Such transactions would normally be subjected to review by a human reviewer if they are not clearly fraudulent or clearly acceptable.

An "attribute" may include a characteristic of a transaction such as whether or not the transaction is fraudulent or non-fraudulent, and whether the transaction eventually ended up being a charged back or chargeback transaction. An attribute may also be based on whether the transaction was accepted or rejected by a human reviewer. Thus, for example, in embodiments of the invention, a transaction may have an attribute such as "accepted by reviewer" or "rejected by reviewer."

"Segmenting" may include separating. In embodiments of the invention, a number of transactions may be segmented based on one or more attributes. For example, if there are 10,000 transactions out of which 500 transactions are chargeback transactions. Those 500 transactions may be segmented from the 10,000 transactions based on the attribute "chargeback transactions."

"Key indicators" may include features that differentiate the segmented transactions from the other transactions in the larger set of transactions that included the segmented transactions. For example, in the above example describing chargeback transactions as a segmented group of transactions, it may be determined that most of the chargeback transactions come from the same zip code 94555, while the other transactions did not. Thus, in this example, the zip code 94555 may be a key indicator differentiating the segmented transactions from the other transactions. Examples of key indicators may include, but are not limited to, the type of transaction, the amount of a transaction, the time of purchase, the date of purchase, the type of payment device used (e.g., credit, debit, check, etc.), or the type and/or quantity of goods purchased.

A "transaction rule" may include a fraud rule. Exemplary transaction rules may include thresholds which may trigger such rules. For example, an exemplary transaction rule may be "flag for review if there are more than 10 items in the order." In some embodiments, transaction rules can be suggested by segmented transaction data. In this case, a transaction rule may correlate an attribute and a key indicator. For example, in the above noted example, a transaction rule may be "flag for review if the order originates from zip code 94555." The reason for flagging transactions that meet this criterion may be that transactions that originate from zip code 94555 may be transactions that are likely to be chargebacks.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "client computer" may include any suitable computational apparatus. The client computer may be an apparatus operated by a consumer, a user associated with a merchant, or any other individual. The client computer may use any suitable wired or wireless network, including the Internet, in order to communicate with other systems. A merchant client computer may be used by a user associated with a merchant to interact with other merchant computer systems and a fraud detection system.

In some embodiments of the invention, transaction rules are suggested to a merchant, after a merchant provides one or more attributes to segment transaction data. The segmented transaction data is then correlated to at least one key indicator corresponding to the segmented transaction data. The key indicator and the attribute can be used to generate a merchant specific transaction rule (e.g., a fraud detection rule) that can be suggested to the merchant for use in evaluating subsequent transactions.

An exemplary system for fraud detection can be seen in FIG. 1. A plurality of merchants 17 and issuers 16 communicate with a payment processing network 10 using a network interface 11. Payment processing network 10 also communicates with a central server computer 12 which includes a processor 13 and a Computer Readable Medium (CRM) 14. A decision manager module 15 may be stored on CRM 14 that provides fraud detection functionality to different users.

In an exemplary embodiment, a rule suggestion engine 15e along with rules and profiles database 15a, fraud data database 15b, client profiles database 15c, and transaction data database 15d are shown as part of decision manager module 15. Decision manager module 15 is configured generate fraud detection rules and merchant profiles in a fraud detection system. Aspects of the decision manager module 15 are further explained in the co-pending U.S. application Ser. No. 13/458,910, entitled "Fraud Detection System User Interface," by B. Scott Boding and Cory H. Siddens, filed on Apr. 27, 2012, which is herein incorporated by reference in its entirety.

Merchants 17 may operate one or more client computers that are capable of purchasing goods or services. In embodiments of the invention, a user may be a merchant, an employee of the merchant, or any other individual who has access to a client computer.

In a typical transaction, a consumer may purchase goods or services at a merchant 17. The merchant 17 may operate a Website running on a merchant server computer, and may be an e-commerce merchant. The transaction order details for an order may be transmitted to the central server computer 12 by the one or more merchants 17. The central server computer 12 may process the transaction to determine if the order should be accepted and processed, or rejected as being potentially fraudulent. If the central server computer 12 determines that the order should be accepted, then the central server computer 12 may communicate with one or more issuers 16 to obtain payment for the one or more merchants 17. If the central server computer 12 determines that the transaction is clearly fraudulent or should be sent to a human reviewer to determine if the order should be accepted or rejected, then the central server computer 12 may provide this information to the one or more merchants 17 so that they may take the appropriate action.

For illustrative purposes, a certain number of components are shown in FIG. 1. However, it is understood that embodiments of the invention may include more than one of each component. In addition, some embodiments of the invention may include fewer than all of the components shown in FIG. 1. Also, although the server computer 12 is shown as being outside of the merchants 17, it may be located within or operated by the merchants 17 in other embodiments.

The rules and profiles database 15a contains different set of rules and profiles for different merchants. Rules and profiles database 15a may contain core set of rules and rule profiles specific to each merchant. New rules and profiles developed in response to fraud patterns and in response to specific types of business needs can be stored on rules and profiles database 15a as well.

The fraud data database 15b stores fraud data, e.g., statistics and desired transaction attributes provided by merchants 17 and issuers 16. In one embodiment, fraud data can be shared between the merchants if it is consistent with privacy laws. For example, if merchant A is a large electronics retailer and has a fraud profile A, it may be possible to share profile A or aspects of profile A with a merchant B that is a small electronics retailer. Such retailers may view fraud from substantially the same perspective and the profiles of such merchants may be commonly used in some cases.

Different merchant profiles can be stored in the client profile database 15c. Merchant profiles may include information about the merchant's company, such as size of the company, number of transactions per month, type of the company and such.

Transaction data database 15d contains historical transaction data from a merchant. In another embodiment, historical transaction data from other merchants may be used as well. Historical transaction data may be used to generate custom rules for fraud detection based on a user specified attribute. Transaction data may include data related to specific transactions, and may include the type of goods or services purchased, the type of payment mechanism used, the quantity of goods or services purchased, the shipping address, the billing address, and other information relating to ordering goods.

The default rule generator engine 15f can use data from the fraud data database 15b, rules and profiles database 15a and/or client profiles database 15c, to generate a set of default rules and profiles and to update previous rules and profiles. In some embodiments, each type of business can have a different set of default profiles and rules.

Because payment processing network 10 receives input from many types of merchants 17, it can determine increased fraud patterns of particular like businesses as well as current fraud techniques implemented by other businesses. With such information, the rule suggestion engine 15e can assess the type of rules which may be beneficial to each type of business based on a standard set of attributes and based on a specified attribute having a correlation. Since each business differs from another, the rules can still be modified, if desirable.

To modify fraud detection rules, each merchant 17 can login through a web portal using a client computer to payment processing network 10 and set, remove, and modify rules. The rules selected by each merchant 17 can be stored on the client profile database 15c. Accordingly, each time a transaction is processed for a merchant by the payment processing network 10, that merchants' client profile can be utilized.

The rules suggestion engine 15e can operate in an any number of ways, depending on the level of processing, input/feedback, and base client information provided to the payment processing network 10 from both the merchants and other relevant sources, e.g., other card networks fraud reports, issuers, acquirers, etc. The rules suggestion engine 15e can be utilized to generate a set of rules or one or more specific profiles for a user, such as a merchant or other client.

Figure 2:
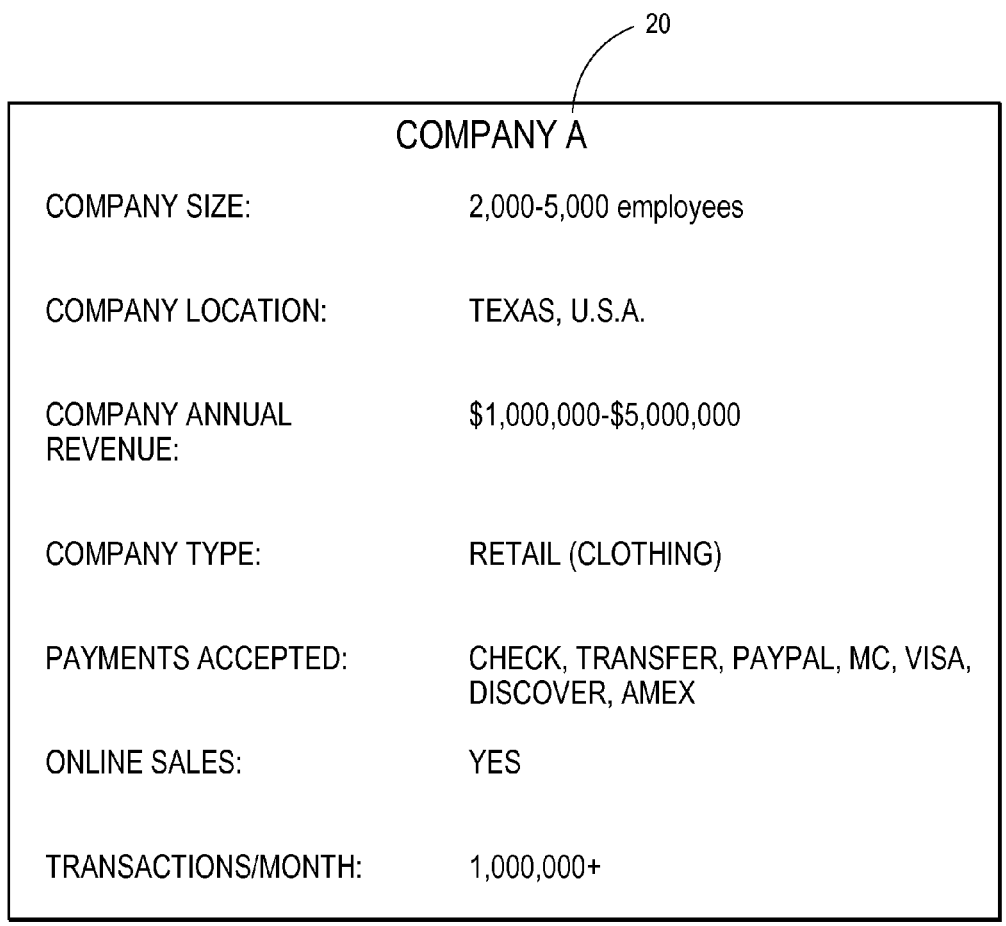
FIG. 2 shows an exemplary summary of a company for implementing a user profile in accordance with an embodiment.

FIG. 2 illustrates an exemplary data profile for Company A that can be used to generate a default set of rules and rule profiles.

As shown in FIG. 2, Company A 20 can be a company that has 3,000 employees, is located in Texas, earns $2 million in annual revenues, offers clothing for sale, takes a plurality of payment devices, has an online store and conducts more than one million transactions a month. In some embodiments, the rules suggestion engine 15e can utilize one or more of these characteristics to generate a set of rules which applies to that particular company. In some embodiments, the rules generated for the company are solely based on the characteristics provided by the user. In other embodiments, the rules suggestion engine 15e pulls data from profiles of like companies, e.g., having four or more similar characteristics, and/or from known fraud patterns for like companies.

The rules suggestion engine 15e can also offer suggestions alongside a user's current rule profile. For example, a floating tag box can hover above a suggested change to a rule in a rule review pane. A suggestion can state "Changing priority from 4 to 3 might reduce fraudulent transactions by 0.046%" as a tool, or tip, hovering above a priority dropdown list box.

In some embodiments, a merchant can customize its fraud detection and sorting algorithms by selecting rules from a larger list of rules. Once selected by a merchant in a profile for a business line, multiple core rules can auto-populate into other profiles (i.e., sets of rules) that a merchant might want to use or try. In this way, merchants do not have to continually select those rules to create other profiles for testing or production.

In one embodiment of the invention, the rule suggestion engine 15e provides a set of rules as suggested rules for future transactions. This is further explained with the help of flow diagrams of FIGS. 3A-3B.

Figure 3A:
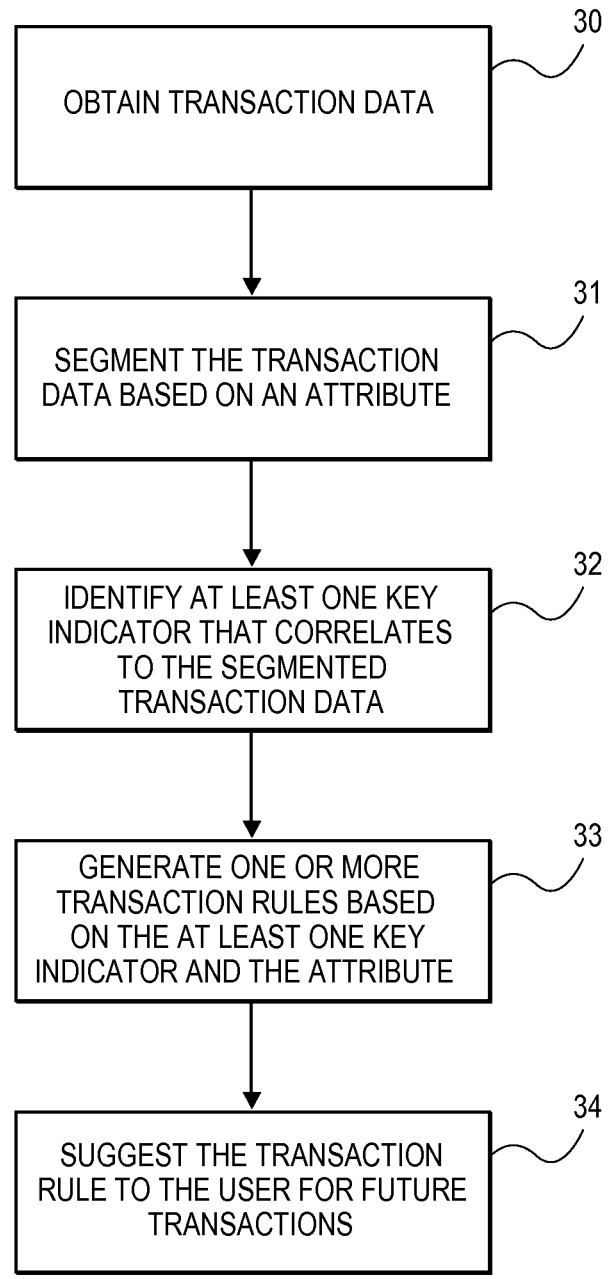
FIG. 3A illustrates an exemplary flow diagram, illustrating a method for performing embodiments of the invention for providing transaction rules as suggested rules for fraud detection.

FIG. 3A illustrates an exemplary flow diagram, illustrating a method for performing embodiments of the invention for generating transaction rules for fraud detection.

In a step 30, the rule suggestion engine 15e obtains transaction data which may be stored in transaction data database 15d. Transaction data may be comprised of a number of individual transactions. Each transaction may include, but is not limited to, the following types of information: consumer name, consumer billing address, consumer shipping information, consumer phone number, consumer account number, order amount, items purchased, type of transaction, etc. Transaction data may include historical transaction data over a period of time, for example, a week, for a specific merchant. In another embodiment, transaction data from a plurality of merchants may be used.

Further, in some embodiments, the transaction data may include transactions that are not clearly fraudulent and not clearly acceptable. For example, a merchant may have fraud detection scoring algorithm where transactions with a score of 1-5 are clearly acceptable, and transactions with a score of 8-10 are clearly fraudulent. Transactions with scores of 6-7 may be sent to reviewers. In some cases, it is this set of transactions that would benefit from suggested rules that could better classify them as fraudulent or acceptable, so that they do not have to be subjected to human review.

In step 31, rule suggestion engine 15e segments the transaction data based on one or more attributes. The attribute may be user specified. In one embodiment, the rule suggestion engine 15e can provide a pop up window which offers a user the ability to enter a specific attribute (e.g., fraudulent transactions, non-fraudulent transactions, transactions approved by human reviewers, transactions rejected by human reviewers, transaction from the same IP (Internet Protocol) address, etc) of a transaction which is desirable to monitor. For example, a merchant can login to payment processing network 10 and specify an attribute through a web portal. In one embodiment, the rule suggestion engine 15e analyzes each transaction data to determine if the attribute applies and segments the transaction data based on the attribute. For example, if the user specified attribute is "chargebacks", the rule suggestion engine 15e separates all transactions that satisfy the attribute "chargebacks" from other transactions.

In step 32, the rule suggestion engine 15e identifies at least one key indicator that correlates to the segmented transaction data. The key indicators can be selected from a list of predefined indicators that correspond to features of the transaction, which place that transaction into the specified segmented data, e.g., user defined custom category. As an example, for all the transactions having "chargebacks" as segmented in step 31, key indicators correlating to "chargebacks" could be a particular zip code where most of the transactions originated or the same telephone area code.

Since there are many potential key indicators, the key indicators may be chosen by the server computer 12 from a list of possible key indicators, and the chosen key indicators may be compared against the segmented transactions to see if they differentiate the transactions in a statistically significant manner. Alternatively, the server computer 12 may automatically identify those key indicators from the segmented transactions. For example, if 50 transactions are grouped and classified as being fraudulent, while 150 transactions are not fraudulent; the server computer may analyze the transaction data and may determine that key indicators including transaction amount over $1000 and transactions from Europe correlate with the segmentation.

In step 33, rule suggestion engine 15e generates one or more transaction rules based on the at least one key indicator and the attribute. The key indicator could be commonalities among different transactions that may indicate a correlation that could be used for detecting a fraudulent transaction. Referring back to the previous example, a rule can be built around the transactions having the attribute of "chargebacks" and originating from a particular zip code. That is, a rule could be set up which indicates that transactions from that particular zip code should be flagged for human review, because they may likely end up being chargeback transactions (which are undesirable for merchants).

In step 34, the rule suggestion engine 15e suggests the transaction rule to the user that may be applied for future transactions for fraud detection. The user can choose to either implement the rule, modify one or more of the rules, or chose not to use the suggested rule. If the user chooses not to use any of the suggested rules, the default profiles and rules setting will be applied to the company's transactions. Alternatively, the user can choose to create a new profile and customized rules as will be discussed in later sections.

Figure 3B:
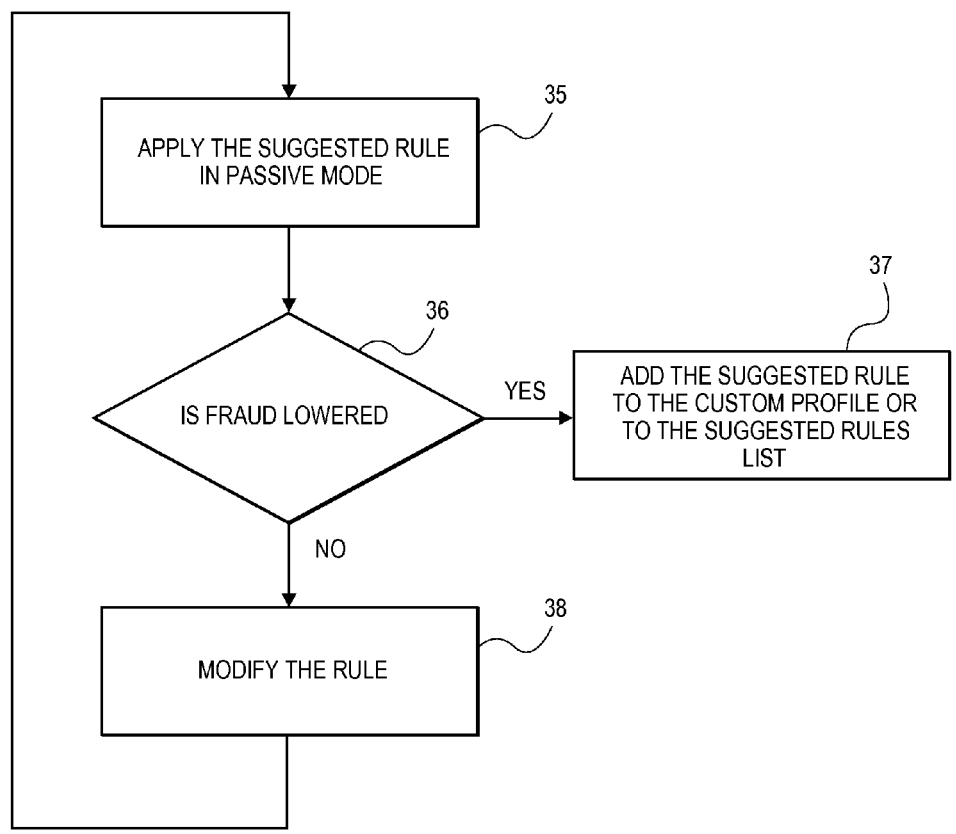
FIG. 3B illustrates an exemplary flow diagram, illustrating a method for performing embodiments of the invention for applying the suggested rules for fraud detection.

FIG. 3B illustrates an exemplary flow diagram, illustrating a method for performing embodiments of the invention for applying suggested rules for fraud detection.

In step 35, the rule suggestion engine 15e applies the suggested rule in passive mode to detect the fraudulent transactions. A "passive mode" is one in which the rule is not actually applied in reality to reject the transaction, but is applied to a transaction to see how the rule performs. In one embodiment, the suggested rule is stored in rules and profiles 15a for one or more merchants and the transactions are observed for a period of time. In one embodiment, rule suggestion engine 15e compares the application of the current set of rules to a set of transaction data with the application of the amended set of rules to the same set of transaction data. If the result of the comparison indicates that the fraud would be reduced by the application of the amended set of rules, then the difference between the amended set of rules and the current set of rules can be suggested to the user.

In step 36, if the rule suggestion engine 15e determines that the fraud is lowered to a predetermined level or degree by applying the suggested rule, the suggested rule can be automatically added to a customized profile of the user or to the suggested rules list, as shown in step 37. For example, if it is determined that transactions initiated from a particular geographic location are more fraudulent, a rule can be suggested that elevates the priority of rules based on the geographic location. If a rule is triggered, then the transaction may be flagged for a human analyst to analyze.

If the rule suggestion engine 15e determines that the fraud is not lowered to a desired level or degree, it can modify the rule in step 38. In one embodiment, the rule suggestion engine 15e modifies the rule by iterating through the steps 31-34. For instance, a rule such as "is transaction over $500" may be modified to have a greater or lower threshold value (e.g., $400) until the desired fraud rate is obtained. In another embodiment, the rule suggestion engine 15e changes the priority of the rule to determine whether the fraud can be lowered. Once the rule is modified, the rule suggestion engine 15e can test the rule by repeating steps 35-38. The rules profiles with the suggested rules can be applied to actual historical data or test historical data.

Historical data from other merchants can also be used to suggest rules to a particular merchant if it is consistent with privacy laws. For example, if large box retail electronic stores are experiencing a certain type of fraud that is minimized with a particular set of rules, then some of the rules may be suggested to smaller local retail electronics merchant.

Figure 4:
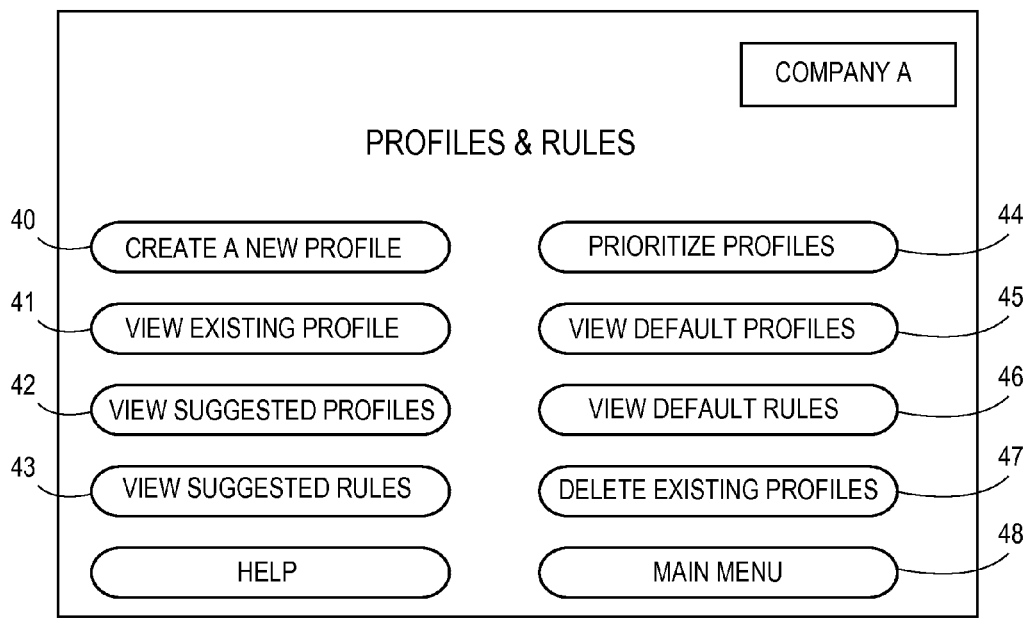
FIG. 4 shows an exemplary profiles and rules selection menu in accordance with an embodiment.

FIG. 4 illustrates an exemplary user interface for selection of profiles and rules for a particular merchant.

Profiles and rules interface may be part of a Main menu 48 interface (not shown) that provides the user various buttons to view, create or delete different rules and profiles. The users can view the default rules and profiles for their particular company using a "view default profiles" button 45 and "view default rules" button 46.

Once the rule suggestion engine 15e generates a set of rules and/or one or more profiles for the user's company, the user can view the suggested rules by selecting a "view suggested rules" button 43 and view suggested profiles by selecting a "view suggested profiles" button 42. The users can then choose to either implement the rules, modify one or more of the rules/profiles, or chose not to use the suggested rules/profiles.

If the user chooses not to use any of the suggested rules or profiles, the default profile and rules setting will be applied to the company's transactions. Alternatively, the user can choose to create a new profile using a "create a new profile" button 40. If the user chooses not to keep the existing profiles, it can select "delete existing profiles" button 47 to delete one or more existing profiles.

If the user has already implemented a set of rules or profile, the user can then select to view the existing profile by selecting a "view existing profile" button 41 and modify that profile, add newly suggested rules, modify current rules, or change other profile settings, e.g., priority.

The user can set the priority of different profiles by selecting a "prioritize profiles" button 44. In one embodiment, the priority for each profile is set to a default value.

Figure 5:
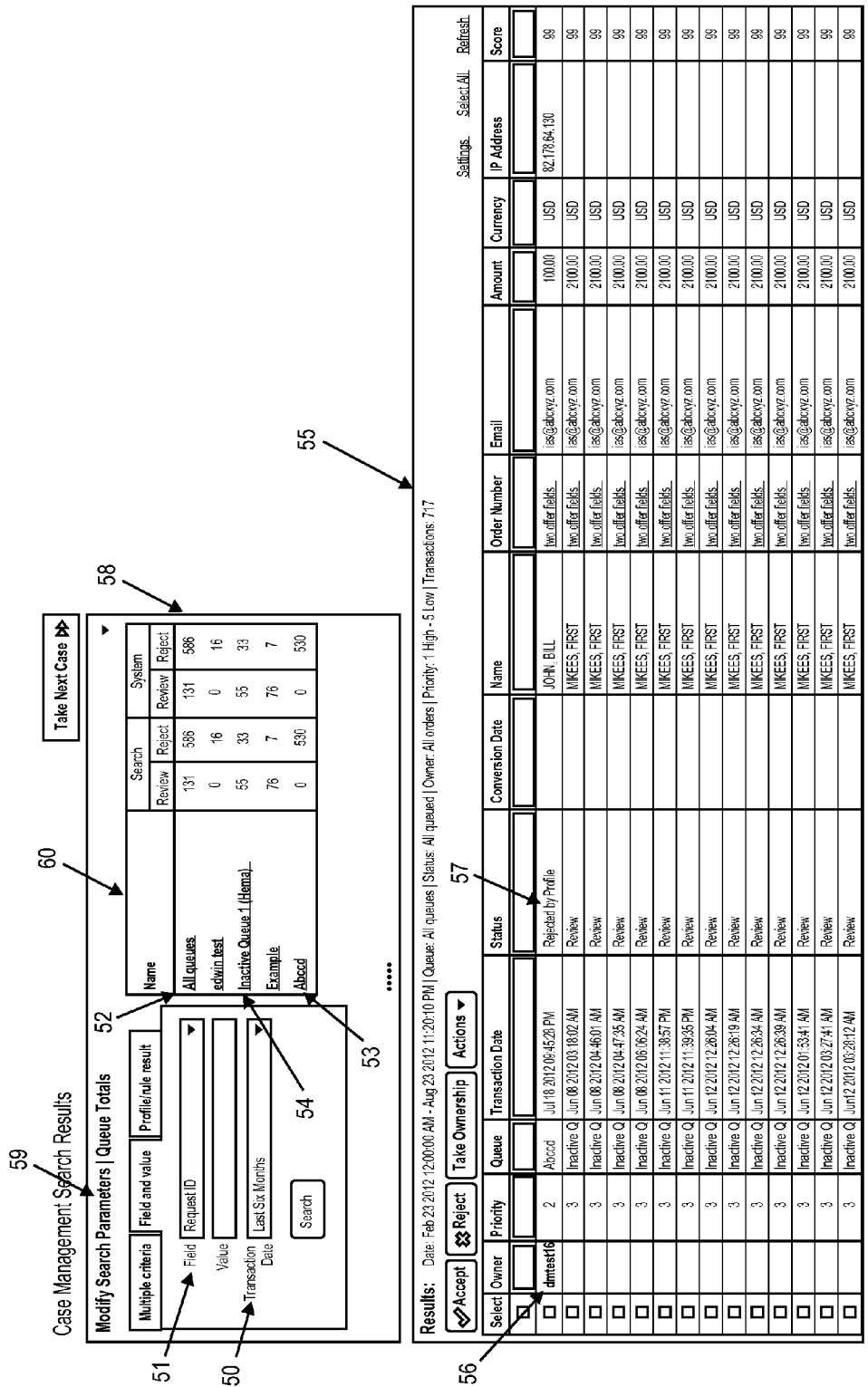
FIG. 5 shows a user interface including exemplary search results for a set of transaction.

FIG. 5 illustrates an interface with exemplary search results for a set of transactions, which can be used to obtain transaction data (e.g., step 30 in FIG. 3A). Although one specific interface is disclosed, other search interfaces may be used in other embodiments of the invention.

A table 58 illustrates a user interface for specifying various search parameters to select a set of transactions. Search parameters can be specified in Modify Search Parameters field 59 by selecting various fields, such as field 51 and transaction date 50. In this example, transaction date 50 is set to "Last six months" for displaying transactions in last six months based on the Request ID. A table 60 illustrates the number of transactions divided in to different queues as a result of the search. In this example, All queues 52 comprises of four queues, where each queue may have a set of transactions based on different profile selectors. Profile selectors may be based on a set of rules set by the merchant, such as "transactions for overnight shipping", "transactions over $500", etc.

An exemplary table 55 displays the transaction details for transactions listed in different queues, which are part of All queues 52. A transaction 56 listed in a queue Abccd 53 shows a status 57 as "rejected by profile". Table 55 also lists some of the transactions from an Inactive queue 54 which have the status 57 as "Review".

As illustrated in the exemplary table 55, transaction 56 gets rejected using the default profile, whereas, all the transactions in Inactive Queue 54 need to be reviewed. These are the transactions which can be analyzed by Rules suggestion engine for generating transaction rules so that the human review is minimized.

Figure 6:
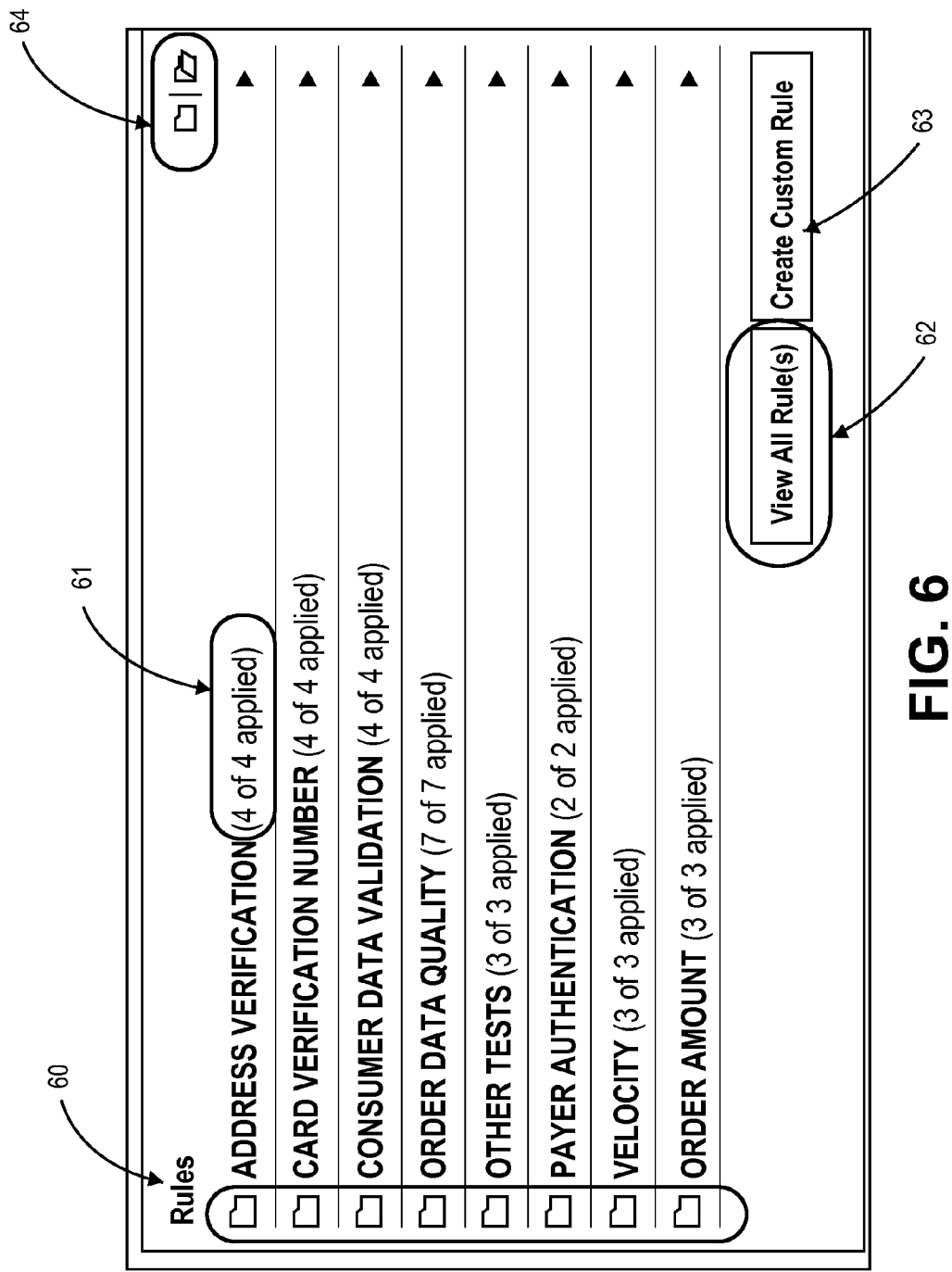
FIG. 6 shows a user interface including categories of rules in accordance with an embodiment.

FIG. 6 illustrates an exemplary set of default categories that can be provided for each new or existing (e.g., default or custom) profile. The categories 60 can each contain a set of rules which provide a category specific fraud detection being utilized in that profile. The rules can be default rules within each category 60 or can be customized and added to the categories. An indication 61 of the rules being utilized in each category is also shown in the listing of categories. The user optionally can view all rules 62 currently being applied in a profile or can create a custom rule 63 and/or category within the profile.

In one embodiment of the invention, a priority level for each profile can be selected according to the business rules or the types of orders that will be screened by the profile. Exemplary priority levels may range from 1 (high) to 5 (low). In one embodiment, the default priority level is 3. Orders are assigned priority according to the level set for the profile.

For each rule, one can select the appropriate checkbox for profile impact on the order. In one embodiment, one can choose one option for each rule:

Monitor: the rule will be used to evaluate the order, but the result will have no impact on order acceptance or rejection. This setting can be used for rules that one wants to test before putting in production.

Accept: the order will be automatically accepted. This rule can be used for specific cases only, for example when customers added temporarily on the positive list re-place an order.

Review: the order will be placed in a review queue.

Reject: the order will be automatically rejected.

In one embodiment, a priority level for each rule can be set. As noted above, priority levels may range from 1 (highest) to 5 (lowest). Selections take effect as soon as the profile is updated. By default, no priority is set for any rule. If a profile is saved in which no priority is assigned to a rule, orders are assigned the profile's priority. When one sets a priority level to a rule, orders are assigned priority as follows:

Orders are assigned priority according to the triggered rule that has the highest priority level.

The priority level of any triggered rule supersedes that of the profile (1) whether the rule' priority is higher or lower than that of the profile and (2) regardless of the impact of the rule (accept, monitor, review, or reject) on the profile.

FIG. 7A shows an exemplary illustration of first two sets of rules, or categories. Each category can include any number of predefined or custom rules 72. Because the profile priority 70 is the default (3), the order is assigned priority as follows, for example:

Address verification rules 71: If the second or fourth rule is triggered (priority=1), the order is given the highest rule priority (1). If the first rule is triggered (priority=4), the order is given priority "4". If the first two rules are triggered, the order is marked for review (first rule), and the priority is "1" (second rule even if set to Monitor). If no rule is triggered, the order is given the priority of the profile (3).

New category rule 73: Because no priority is set, this rule does not affect the order's priority if it is triggered.

In one embodiment, a set of pre-defined rules are set to provide basic monitoring of transactions. By default, in such an embodiment, all pre-defined rules are initially set to monitor, except for the following rules:

| Default Setting | Pre-Defined Rule |
| --- | --- |
| Review | Suspiciously high number of account numbers |
|  | Billing and/or shipping address not verifiable |
|  | Geolocation inconsistencies in order |
|  | Letter combinations not found in English |
| Reject | Customer on the negative list |
| Accept | Customer on the positive list |

Referring now to FIG. 7B, although one typically cannot modify the conditions in pre-defined rules, one can change the category where the rule is located, its setting as a core rule, and its role in the profile. For example, as shown in FIG. 7B, this pre-defined rule 72 is located in the Address Verification category 74, the core rule box 75 is checked, and its role is to monitor only 76. All other fields are disabled.

FIG. 8 shows an exemplary profile with its corresponding rules list 81 in one embodiment. A rules list can contain all the categories that contain core and custom rules for a profile. Categories are pre-defined or user-defined sets of rules that one can group together as appropriate for a business. One may create new categories and add rules to categories as desired. In some embodiments, a number next to the name of a category indicates the number of rules in the category. For example, one might create a category of rules associated with payment types or specific groups of products. By default, the categories are open in some embodiments.

In some embodiments, each category can be based on a user specified attribute, which is utilized to segment transaction data prior to application of a rule. For example, if a user chooses to customize a profile and add a category, a dialog box can appear to allow the user to enter the attribute, e.g., chargebacks. The attribute is then utilized to segment each transaction that is made for the company and apply rules for that category. The rules for each category can be generated by rules suggestion engine 15e and can be based on common attributes, or key indicators, which correlate to the segmented data.

Referring again to FIG. 8, as illustrated, the profile contains any number of categories 83, which are targeted to differentiate fraudulent and non-fraudulent transactions with the user's company. Each category, e.g., address verification 83, has a plurality of rules 82, which are also each targeted to fraud related to the transactions of that company. For example, company A in FIG. 2 may have more fraud related to order data quality than card verification, whereas another company may have more fraud related to consumer data validation. In some embodiments, the categories are pre-defined or customized by a user and the rules in each category are generated based on a user specified attribute in the same manner discussed in the previous paragraphs. Accordingly, the transaction is analyzed based on a particular category and the transaction data in that category is further segmented in order for an applicable rule to be generated.

In addition to providing pre-selected rule categories and rules within each category, a profile 80 can also provide how each rule is applied 85, e.g., monitor, accept, review, reject, as well as the prioritization 84 of that rule. A profile can include any number of categories defined user specified attributes and the subsequent generated rules which correlate to the attribute of the segmented transaction data in that category.

Figure 9:
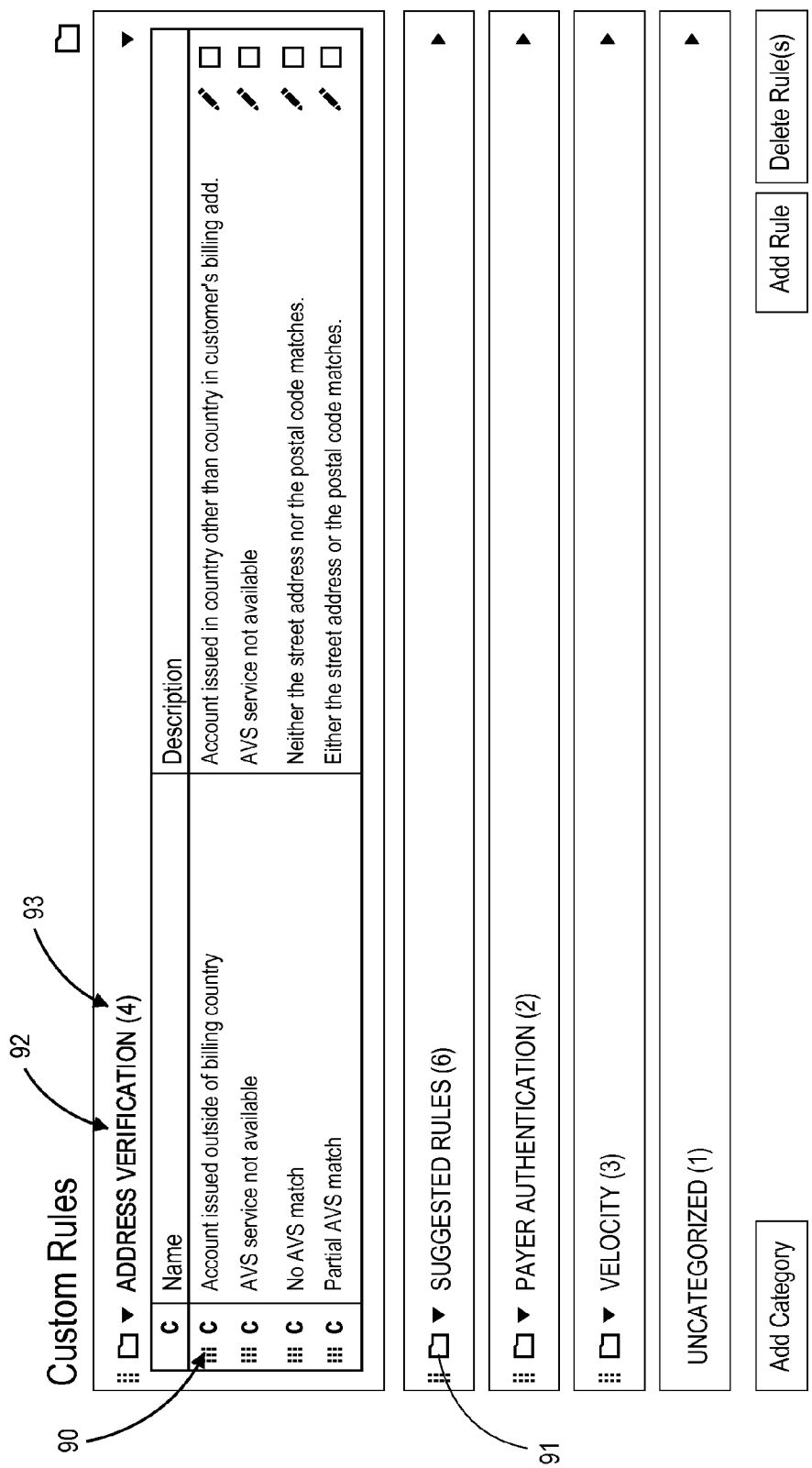
FIG. 9 shows a user interface including custom rule categorization in accordance with an embodiment.

FIG. 9 illustrates a folder in an exemplary set of suggested rules 91 within the user's custom rules menu. Note that only the category 92 is open. The number 93 next to the category indicates the number of rules in that category. For example, if a user does not want to implement an entire suggested rules profile, such as that described with reference to FIG. 8, the user can navigate to the custom rules menu.

As described earlier, the user can create rules, categories of rules, modify current rules and categories and move rules between categories. Each rule and/or category of rules can be based on user specified attribute or attributes of a transaction, which are utilized to segment transaction data and generate corresponding rules from key indicators correlating to that transaction data. With the suggested rules engine, a new category can appear within the custom rules menu, which individually lists each rule provided in the suggested rules profile of FIG. 8. The user can then view each suggested rule and select it for implementation, modify it, move it into another category, or not use it. If the user decides to utilize a custom rule, suggested rule or default rule, the type of rule 90 can be indicated in the rules menu.

In embodiments of the invention, the rule suggestion engine 15e (FIG. 1) determines whether a transaction is accepted or rejected based on a core set of rules specific to the merchant. If the transaction is accepted or rejected without any review, the transaction is completed and the merchant is informed accordingly. If the transaction requires review, rule suggestion engine 15e provides an automated fraud detection process by using custom rules specific to a user.

In one embodiment, profile selector rules are applied before analyzing the transactions for the merchants to determine which profile to use for a particular transaction. For examples, merchants can have different risk profiles for different scenarios, such as, expedited shipping, orders over $1000, etc. Profile selectors are rules that one can use to select the profile that will evaluate each order. In some embodiments, one can create up to 100 active and 100 passive selector rules. Each order is pre-screened against each selector rule according to their placement in the table. A profile is selected according to data in the request (not the reply), such as product category, order amount, or shipping information. When creating selector rules, one can use custom fields and lists. One may want to create a rule to select a specific payment type or a high monetary amount profile. Selector rules may have more than one condition, such as order exceeds 15 items and invoice amount exceeds $500.

FIG. 10 shows an exemplary illustration of screenshot of a selection of order profiles. In some embodiments, the rules suggestion engine 15e in FIG. 1 can additionally provide suggested order selection rules for the order of the suggested profiles, e.g., Passive Profile 100, to be implemented. As shown, the user also has the choice to add a profile with core rules 101 to the profile order listing. In some embodiments, the suggested profiles can be selected through the selection of a core rule profile 101. In other embodiments, an additional button (not shown) may be provided which allows the user to either generate a new suggested profile or add a suggested profile to the order.

Referring again to FIG. 10, the rules suggestion engine can also provide a plurality of suggested profile selector rules 102, which can be utilized to select suggested and default profiles in the order profiles list. Each of the suggested profile selector rules can be automatically selected if the user chooses to implement a corresponding suggested or default profile. In some embodiments, these suggested profiled selector rules 102 are transparent to the user if not suggested or default profile is utilized. In other embodiments, the suggested profile selector rules are based on user defined categories within a company.

Embodiments of the invention provide the technical benefits of automating the review process for fraud detection of payment transactions by reducing the human intervention. By suggesting rules generated from user attributes correlated with key indicators from historical transaction data to lower the fraudulent transactions in future, resources are saved as human analysts would be required to review fewer transactions than in the past.

Figure 11:
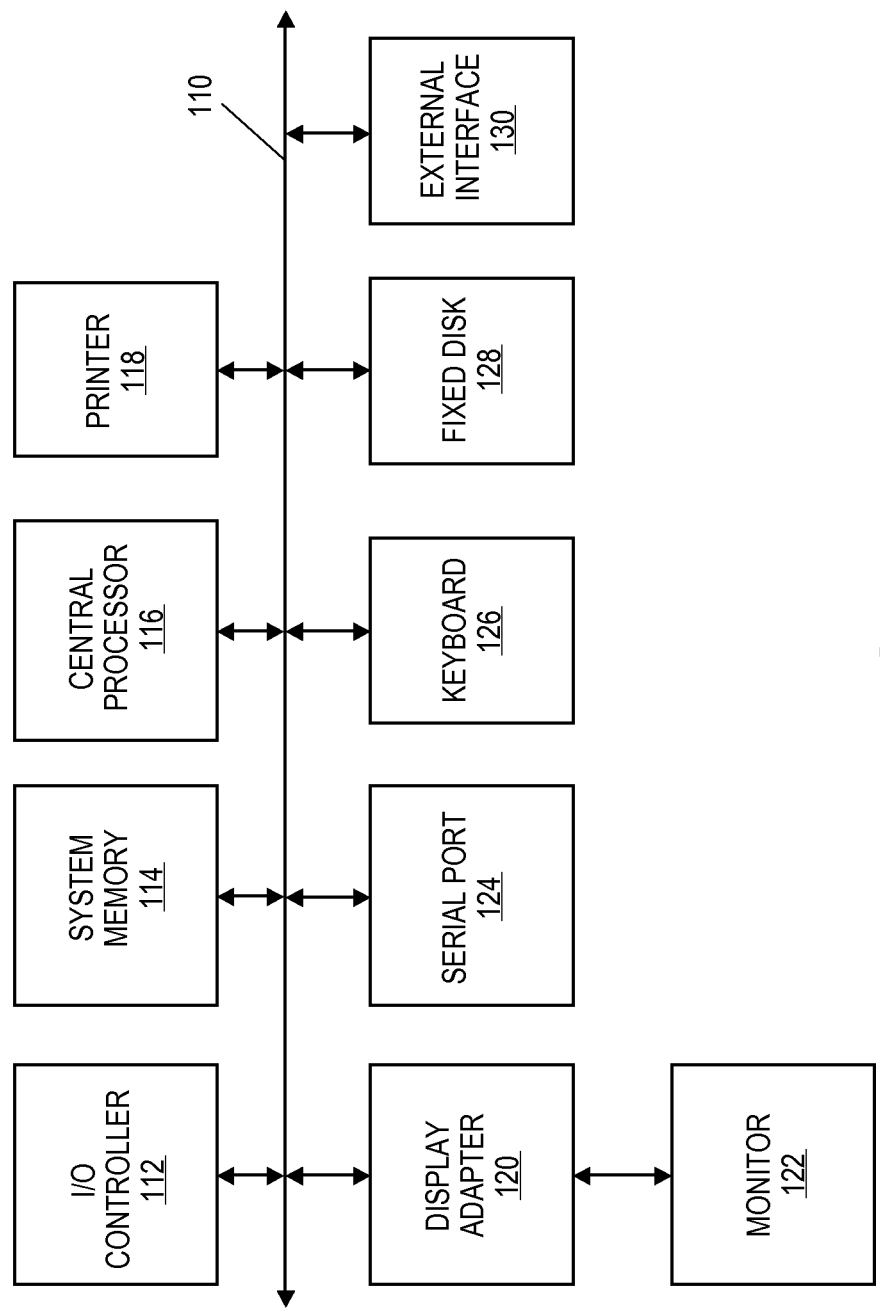
FIG. 11 shows a block diagram of a computer apparatus in accordance with an embodiment.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 11. The subsystems shown in FIG. 11 are interconnected via a system bus 110. Additional subsystems such as a printer 118, keyboard 126, fixed disk 128 (or other memory comprising computer readable media), monitor 122, which is coupled to display adapter 120, and others are shown. Peripherals and input/output (I/O) devices, which couple to I/O controller 112, can be connected to the computer system by any number of means known in the art, such as serial port 124. For example, serial port 124 or external interface 130 can be used to connect the computer apparatus to a wide area network such as the Internet, a mouse input device, or a scanner. The interconnection via system bus 110 allows the central processor 116 to communicate with each subsystem and to control the execution of instructions from system memory 114 or the fixed disk 128, as well as the exchange of information between subsystems. The system memory 114 and/or the fixed disk 128 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

One or more features from any embodiment may be combined with one or more features of any other embodiment without departing from the scope of the disclosure.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method of automatic fraud detection, the method comprising:
   obtaining, by a processor, transaction data from a plurality of transactions;
   segmenting, by the processor, the transaction data based on at least one attribute defined by a user;
   identifying, by the processor, one or more key indicators corresponding to the segmented transaction data;
   determining, by the processor, a correlation between the one or more key indicators and the at least one attribute defined by the user; and
   generating, by the processor, one or more suggested transaction rules based on the correlation.

2. The method of claim 1, further comprising:
   detecting, by the processor, fraud in subsequent transactions using the one or more suggested transaction rules.

3. The method of claim 1 wherein the user is a merchant.

4. The method of claim 1, further comprising:
   modifying, by the processor, the one or more suggested transaction rules.

5. The method of claim 1, further comprising:
   adding, by a processor, the one or more suggested rules to a rule profile for the user.

6. The method of claim 1, further comprising:
   providing, by the processor, a user interface allowing the user to identify the one or more suggested transaction rules to one of: accept, reject, review, or monitor.

7. The method of claim 1, wherein the plurality of transactions includes one or more transactions that are not clearly fraudulent or not clearly authentic.

8. A server computer comprising:
   a processor; and
   a non-transitory computer readable storage medium, comprising code executable by the processor for implementing a method comprising
   obtaining transaction data from a plurality of transactions,
   segmenting the transaction data based on at least one attribute defined by a user,
   identifying one or more key indicators corresponding to the segmented transaction data,
   determining a correlation between the one or more key indicators and the at least one attribute defined by the user, and
   generating by the processor one or more suggested transaction rules based on the correlation.

9. The server computer of claim 8, further comprising:
   detecting fraud in subsequent transactions using the one or more suggested transaction rules.

10. The server computer of claim 8, wherein the user is a merchant.

11. The server computer of claim 8, further comprising:
    adding the one or more suggested transaction rules to a rule profile for the user.

12. The server computer of claim 8, further comprising:
    providing a user interface allowing the user to identify the one or more suggested transaction rules to one of: accept, reject, review, or monitor.

13. A method comprising:
    accessing a server computer by a client computer, wherein the server computer is configured to implement a method comprising:
      obtaining transaction data from a plurality of transactions;
      segmenting the transaction data based on at least one attribute defined by a user,
      identifying one or more key indicators corresponding to the segmented transaction data;
      determining a correlation between the one or more key indicators and the at least one attribute defined by the user; and
      generating one or more suggested transaction rules based on the correlation;
      receiving a selection of the one or more suggested transaction rules at the client computer from the user; and
      providing, by the client computer, the selection of the one or more suggested transaction rules to the server computer.

14. The method of claim 13, wherein the user is a merchant.

15. The method of claim 13, wherein the transaction data is obtained from a plurality of merchants.

16. A client computer comprising:
    a processor; and
    a computer readable medium coupled to the processor, the computer readable medium comprising code, executable by the processor for implementing a method comprising:

accessing a server computer by a client computer, wherein the server computer is configured to implement a method comprising:
    obtaining transaction data from a plurality of transactions,
    segmenting the transaction data based on at least one attribute defined by a user,
    identifying one or more key indicators corresponding to the segmented transaction data,
    determining a correlation between the one or more key indicators and the at least one attribute defined by the user, and
    generating one or more suggested transaction rules based on the correlation,
    receiving a selection of the one or more suggested transaction rules from the user, and
    providing the selection of the one or more suggested transaction rules to the server computer.

17. The client computer of claim 16, wherein the user is a merchant.

18. The client computer of claim 16, wherein the segmented transaction data corresponds to a portion of the plurality of transactions.

19. The server computer of claim 8, wherein the transaction data comprises historical data for the plurality of transactions.

20. The server computer of claim 19, wherein the historical data based on a week of particular transaction data for the plurality of transactions.

* * * * *